US005425957A

United States Patent [19]
Gaim-Marsoner et al.

[11] Patent Number: 5,425,957
[45] Date of Patent: Jun. 20, 1995

[54] PRODUCT AND PROCESS FOR PRODUCING A SUCROSE-FREE WATER-CONTAINING MILK CHOCOLATE

[75] Inventors: Gunther Gaim-Marsoner, Hauterive; Claude-Alain Mourot, Cortaillod, both of Switzerland; Theodore S. Lioutas, Sarasota, Fla.

[73] Assignee: Kraft Jacobs Suchard AG, Zurich, Switzerland

[21] Appl. No.: 219,592

[22] Filed: Mar. 29, 1994

[51] Int. Cl.⁶ ............................................. A23G 1/00
[52] U.S. Cl. .................................... 426/98; 426/99; 426/548; 426/660
[58] Field of Search ............... 426/98, 99, 607, 660, 426/548

[56] References Cited

U.S. PATENT DOCUMENTS

| | | | |
|---|---|---|---|
| 3,574,639 | 4/1971 | Forkner | 426/99 |
| 4,637,937 | 1/1987 | Terada et al. | 426/570 |
| 4,810,516 | 3/1989 | Kong Chen | 426/548 |
| 4,980,189 | 12/1990 | Keme | 426/660 |
| 5,017,400 | 5/1991 | Olinger | 426/660 |
| 5,023,106 | 6/1991 | Ehrman | 426/660 |
| 5,238,698 | 8/1993 | Zumbe et al. | 426/572 |
| 5,266,348 | 11/1993 | Zumbe | 426/548 |
| 5,275,835 | 1/1994 | Masterson | 426/607 |

FOREIGN PATENT DOCUMENTS

| | | | |
|---|---|---|---|
| 47044/89 | 12/1990 | Australia | A23G 1/00 |
| 0393327 | 10/1990 | European Pat. Off. | A23G 1/00 |
| WO93/02566 | 2/1993 | WIPO | A23G 1/00 |

*Primary Examiner*—Carolyn Paden
*Attorney, Agent, or Firm*—Joyce P. Hill; Thomas R. Savoie; Thomas A. Marcoux

[57] ABSTRACT

There is provided a product and process to produce a sucrose-free milk chocolate containing from about 2 to about 16 weight percent water by encapsulating a mixture of a water-in-oil cocoa butter emulsion and sucrose-free chocolate composition with a sucrose-free milk chocolate composition.

18 Claims, No Drawings

PRODUCT AND PROCESS FOR PRODUCING A SUCROSE-FREE WATER-CONTAINING MILK CHOCOLATE

BACKGROUND OF THE INVENTION

The present invention relates to a low calorie milk chocolate. More specifically, the invention relates to a product and process for producing a sucrose-free, water-containing milk chocolate and having the taste and mouthfeel of a traditional milk chocolate.

Sucrose-free chocolate for diabetics has long been known wherein sucrose is replaced by sorbitol. Other sugar alcohols similar to sorbitol such as isomalt, lactitol, maltitol, etc., have recently been permitted in foodstuffs including sugar-free milk chocolate compositions. Additionally, edible carbohydrates with lower energy contents than sucrose have been developed which are suitable for inclusion in chocolate. In chocolate production, it has always been the practice to avoid the addition of water to the chocolate composition because of the known determinable effects such as the undesirable hardening of the chocolate composition. However, if water can be incorporated into the chocolate composition without the detrimental effects, lower calorie milk chocolate products can be produced. By the process of this invention, a normal fat-containing milk chocolate, free of sucrose and containing water can be produced which has lower calorie contents than regular sugar-containing milk chocolate and/or polyol containing milk chocolate and yet the product of the present invention provides acceptable flavor, texture and mouthfeel similar to conventional milk chocolate.

SUMMARY OF THE INVENTION

In accordance with the present invention, a process is provided for producing a water-containing, sucrose-free milk chocolate, which comprises forming a shell of a chocolate composition comprising: (a) an admixture of cocoa, cocoa butter, milk, an edible carbohydrate having a metabolizable calorie content less than that of sucrose, an edible emulsifier and sweetener; the cocoa component comprises cocoa liquor or cocoa powder and combinations thereof; the milk component comprises a milk powder with or without fat; the sweetener component comprises a sugar alcohol and the total fat content of said chocolate composition is from about 27 to about 35 weight percent; encapsulated in said shell is a uniform mixture of water-in-oil emulsion of cocoa butter, water, an edible emulsifier, a sugar alcohol and a chocolate composition used to form said chocolate shell or the chocolate composition of the shell without or free of the edible carbohydrates having a metabolizable calorie content less than sucrose.

DETAILS OF THE INVENTION

The product of this invention, because of its chocolate composition and water content, has a lower calorie content than conventional milk chocolate. A chocolate composition used to prepare the shell is also used to encapsulate the water-in-oil emulsion and chocolate composition mixture placed into the sucrose-free chocolate shell. The chocolate composition as used herein has a total fat content ranging from about 25 to about 35 weight percent, preferably between about 30 to about 35 weight percent. The greater portion of the fat is obtained from cocoa butter, calorie reduced fats or its equivalents and combinations thereof. The ingredients include cocoa, milk, an edible carbohydrate having a metabolizable calorie content less than that of sucrose and a sweetener. The cocoa component comprises cocoa powder and cocoa liquor or modifications thereof. The cocoa component is present in amounts ranging from about 7% to about 30%, preferably from about 15% to about 20%, of the total chocolate composition. The milk component can comprise a milk powder with or without fat. The milk powder can be derived from any milk source such as whole milk, skim milk, milk protein and the like. The amount of the milk component in the chocolate composition can range from about 7% to about 20%, preferably from about 12% to about 18% of the total chocolate composition.

The edible carbohydrates used in this invention have a relatively low metabolizable calorie content. These consist of easily metabolized sugars like glucose and fructose linked together to form polymers by bonds which cannot be split by enzymes in the human body. These carbohydrates are only partially metabolized and can therefore have calorie contents which are lower than that of sugar. Such carbohydrates can include polydextrose, oligosaccharides, oligofructose, inulin and the like. Polydextrose is a randomly bonded condensation polymer of D-glucose having an upper molecular weight limit typically exceeding 22,000 while oligofructose consists of a mixture of polymers of fructose with a much lower degree of polymerization, the majority being from two to five fructose units. Polydextrose is the preferred edible carbohydrate, however, its inclusion in conventional sugar-free milk chocolate compositions can degrade the texture and mouthfeel of the resultant chocolate and polydextrose must be used in such a manner to avoid detrimental effects. These carbohydrates can be present in amounts from about 10% to about 45%, preferably from about 10% to about 26% of the total composition.

The sweetener component can include polyols such as lactitol, isomalt, maltitol, sorbitol, mannitol, xylitol, erythritol, galactitol and the like and mixtures thereof. These polyols can be present in the chocolate composition from about 5% to about 55%, preferably from about 15% to about 40% depending on the desired reduction in calorie content. The preferred polyols are isomalt, lactitol and maltitol. If additional sweeteners are required, intense sweeteners such as aspartame, sucralose, alitame, acetosulfame K and the like and mixtures thereof can be used in amounts depending on the sweetness level desired.

In the mixture of the components of the chocolate composition of this invention, edible emulsifiers such as lecithin, polyglycerol polyricinoleate, ammonium phosphatide and the like can be used. In addition, flavoring agents and any other ingredient conventionally used in milk chocolate compositions can be used. Furthermore, ingredients with low calorie count can be used in the milk chocolates of this invention including cereal fibers, cocoa fibers, vegetable fibers, cellulose such as microcrystalline cellulose, pectins and edible gums.

It will be appreciated that in view of the use of polydextrose and a sugar alcohol, the temperature during conching of the chocolate ingredients should be kept at a level below that at which the water of crystallization inherently present in these ingredients is released in order to avoid any undesirable increase in viscosity or agglomeration of the mixture. There are known sugar alcohols especially maltitol or erythritol among others where conching can occur at higher temperatures such as 80° C. or higher. During the refining to achieve mean particle sizes in the range from about 12 to about 50 microns and below this range and during conching stages of the manufacture of the chocolate used in the invention, steps must be taken to avoid any significant absorption of moisture in view of the hydroscopic nature of the sugar alcohols used.

The water-in-oil emulsion incorporated into the sucrose-free chocolate composition as used in this invention, is prepared by mixing, under high shear, cocoa butter, water and a sugar alcohol as used in the sucrose-free chocolate preparation in the presence of an edible emulsifier such as used in the chocolate preparation. The mixing is continued until the globule size of the emulsion ranges between about 20 to about 60 microns. The amount of cocoa butter in the water-in-oil emulsion can range from about 20 to about 40 weight percent. The water which can be obtained from milk, cream, fruit juices and the like is present from about 30 to about 50 weight percent. The sugar alcohol accounts for the remaining percentage except for a small amount of an edible emulsifier, used in varying quantities, in the range from about 0.05 to about 1%.

The water-in-oil emulsion prepared is then blended very carefully with a chocolate mass which can be the same or similar chocolate compositions as described for the shell production. A chocolate composition such as described for the shell formation but without the edible carbohydrate having a metabolizable calorie content less than that of sucrose can also be used. The blending of the water-in-oil emulsion with the chocolate mass must be carried out using a minimum of mixing, i.e., avoiding high viscosities and separation of the cocoa fat to obtain a uniformly mixed water-in-oil emulsion chocolate mass not having lumps, or gum formations. The amount of water-in-oil emulsion ranges from about 20 to about 40 weight percent, and the chocolate mass ranges from about 60 to about 80 weight percent.

The amounts of water-in-oil emulsion chocolate mass placed in the shell of the sucrose-free chocolate composition should be in such amounts that the water content for the total chocolate shell and encapsulated water-in-oil chocolate mass combination ranges from about 2 to about 16 weight percent, preferably 2 to about 8 weight percent. At higher water levels, it is extremely difficult to achieve a satisfactory sucrose-free milk chocolate containing an encapsulated uniformly mixed water-in-oil chocolate mass composition.

The water-in-oil emulsion chocolate mass mixture can be incorporated into the chocolate shell as a unitary filling, multiple layers, discrete drops or stripes as may be desired prior to the complete encapsulation of the chocolate shell. The molded chocolate tablet which is produced with a unitary filling could appear on breaking as a two-phase tablet. An appropriate edible coloring could be added to the water-in-oil emulsion chocolate mass to provide an appearance of a one-phase chocolate tablet.

The unique feature of the product of this invention is that the water in the water-in-oil emulsion distributes over a period of time throughout the sucrose-free chocolate product without any detrimental effects and provides acceptable flavor, texture and mouthfeel similar to conventional milk chocolate.

The following examples illustrate the invention in greater detail.

EXAMPLE

STEP #1: PRODUCTION OF NON-HYDRATED (Dry) CHOCOLATE MASS

The following ingredients were added into a Z-ribbon mixer with the proportion shown below: 9.0 grams of cocoa butter, 13.3 grams of cocoa liquor, 3.5 grams of butter fat, 13.0 grams of skim milk powder, 23.4 grams of maltitol, 2.2 grams of hazelnut paste, 0.03 grams of vaniline, 0.05 of lecithin based emulsifier, 0.08 grams of aspartame, 0.02 grams of acesulfam-K 0.97 grams of milk protein and 26.0 grams polydextrose.

After loading, these ingredients are mixed until a uniform paste is received. The chocolate mass is then transferred to a 5 role refiner and is refined to particle size of 20 microns. Following, the chocolate is loaded into the conch where the conching operation takes place for 8 hours at 80° C.

During the conching operation 8.0 grams of cocoa butter and 0.45 grams of lecithin based emulsifier are added to the mass.

After the conching step the mass is stored at 50° C. for use later. This chocolate mass is the dry chocolate mass (non-hydrated) Step 1.

STEP #2: PRODUCTION OF THE CHOCOLATE MASS FOR THE HYDRATED PHASE 10.75 grams of cocoa butter, 12.70 grams of cocoa liquor, 3.5 grams of butter fat, 14.0 grams skim milk powder, 53.0 grams of maltitol, 1.0 grams of hazelnut paste, 0.05 grams of vaniline and 0.05 grams of lecithin based emulsifier are all added into a Z-ribbon mixer and are blended until a uniform mass is obtained. After mixing and during the step of conching 4.5 grams of cocoa procedure is identical with the one described above in Step #1.

This chocolate is stored at 50° C. and will be referred to as Step 2 chocolate mass.

STEP #3: PRODUCTION OF THE WATER-IN-OIL EMULSION 30.0 grams of cocoa butter, 0.5 grams of polyglycerol polyricinoleate emulsifier, 28.1 grams of sorbitol and 41.4 grams of diionized water are all emulsified into a Water-in-Oil type of emulsion using a high shear Ultraturax mixer.

The water and sorbitol are mixed together before are added slowly and under high shear to the mixture of melted cocoa butter and emulsifier.

The final mixture is a Water-In-Oil emulsion containing 41.4% of water and will be referred to as Step 3 emulsion.

The globule size of this emulsion should be between 20 and 60 microns.

STEP #4: PRODUCTION OF THE HYDRATED CHOCOLATE MASS 32 grams of the Step 3 emulsion and 68 grams of the Step 2 chocolate mass are mixed in a Hobart mixer at 50 rpm for 3 minutes. The result is the hydrated chocolate mass referred to as Step 4 hydrated chocolate or simply as filling chocolate. The temperature of both Step 3 emulsion and Step 2 mass is 40° C. The level of shear during this mixing step should be kept to a minimum, otherwise high viscosity of the hydrated chocolate will be the result.

STEP #5: FINAL ASSEMBLY OF THE CHOCOLATE TABLET 50 grams of dry Step 1 chocolate mass is tempered in the temperature range from about 26°–32° C. and a chocolate tablet shell is made utilizing chocolate molds. The thickness of this shell is approximately 2–3 mm. Following, 50 grams of the hydrated chocolate Step 4 is cooled down to 30° C. and is poured into the solidified chocolate shell. Finally, the remaining of the tempered chocolate mass Step 1 is poured on the top of the semi-crystallized chocolate mass Step 4 to close the shell and form the bottom of the tablet. The bar is then cooled to complete the crystallization process and wrapped like traditional chocolate.

During the first few weeks of storage, moisture migrates from the hydrated mass to the non-hydrated mass. There is an equibration of moisture between the hydrated and unhydrated mass. As a result, the overall texture of the low calorie chocolate tablet is improved. The chocolate tablet that is produced with this technique has 30.0% fewer calories as compared to standard milk chocolate.

What is claimed is:

1. A process for producing a sucrose-free milk chocolate composition containing from about 2 to about 16 percent water which comprises:
   (a) forming a shell of a non-hydrated conched and refined chocolate composition comprising
      an admixture of cocoa, cocoa butter, milk powder, an edible carbohydrate having a metabolizable calorie content less than that of sucrose;
      an edible emulsifier and a sweetener;
      said cocoa component selected from the group consisting of cocoa powder and cocoa liquor and combinations thereof;
      said milk powder selected from the group consisting of fat-containing and fat-free milk;
      said sweetener comprises a sugar alcohol and the total fat content of said chocolate composition is from about 27 to about 35 weight percent; and
   (b) encapsulating into said non-hydrated shell a hydrated chocolate mass comprising a mixture of a water-in-oil emulsion of cocoa butter, water, an edible emulsifier and a sugar alcohol with a chocolate composition selected from the group consisting of the composition of said chocolate shell and a chocolate shell composition free of said edible carbohydrates having a metabolizable calorie content less than that of sucrose.

2. The product of claim 1.
3. The process of claim 1 wherein the water content is present from about 2 to about 8 weight percent.
4. The product of claim 3.
5. The process of claim 3 wherein the total fat content of said shell chocolate composition is from about to about 35 weight percent; the sugar alcohol is selected from the group consisting of sorbitol, mannitol, isomalt, maltitol, xylitol, erythritol, galactitol and mixtures thereof; the edible carbohydrate is selected from the group consisting of polydextrose, inulin and oligosaccharides and the milk component is skim milk.
6. The product of claim 5.
7. The process of claim 5 wherein the sugar alcohol in the composition of said shell is maltitol and the sugar alcohol in said water-in-oil emulsion is a mixture of sorbitol and maltitol.
8. The product of claim 7.
9. The process of claim 7 wherein aspartame is combined with the sugar alcohol in the shell chocolate composition.
10. The product of claim 9.
11. The process of claim 3 wherein the mixture of said water-in-oil emulsion and chocolate composition in said emulsion is incorporated in multiple layers in the shell.
12. The process of claim 11 wherein acesulfame is combined with the sugar alcohol in the shell chocolate composition.
13. The product of claim 12.
14. The product of claim 11.
15. The process of claim 3 wherein the cocoa is present in amounts from about 7 to about 30 weight percent, the milk components are present in amounts from about 7 to about 20 weight percent, the edible carbohydrates are present in amounts from about 10 to about 45 weight percent and the sugar alcohols are present in amounts from about 5 to about 55 weight percent, said amounts based on the total sucrose-free milk chocolate product.
16. The product of claim 15.
17. The process of claim 3 wherein the cocoa is present in amounts from about 15 to about 20 weight percent, the milk components are present in amounts ranging from about 12 to about 18 weight percent, the edible carbohydrates are present in amounts ranging from about 10 to about 26 weight percent and the sugar alcohols are present in amounts ranging from about 15 to about 40 weight percent, said amounts based on the total sucrose-free milk chocolate composition.
18. The product of claim 17.

* * * * *